United States Patent
Chien et al.

(10) Patent No.: US 6,862,174 B2
(45) Date of Patent: Mar. 1, 2005

(54) DRIVE BRACKET ASSEMBLY WITH FASTENER

(75) Inventors: Chieh Nan Chien, Tu-chen (TW); Zhao-Guang Zeng, Shenzhen (CN); Tun Gao, Shenzhen (CN); Deyi Shi, Shenzhen (CN)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 79 days.

(21) Appl. No.: 10/317,783

(22) Filed: Dec. 11, 2002

(65) Prior Publication Data

US 2003/0210520 A1 Nov. 13, 2003

(30) Foreign Application Priority Data

May 9, 2002 (TW) ...................................... 91206531 U

(51) Int. Cl.[7] ................................................. G06F 1/16
(52) U.S. Cl. ........................ 361/685; 361/683; 361/725; 312/223.2; 248/694
(58) Field of Search ................................. 361/683–686, 361/724–727, 740, 759; 364/708.1; 248/27.1, 694, 299.1, 317, 551–553, 609–638; 312/223.2, 223.3, 216, 218, 307, 263; 292/42, 148, 151, 304 R; 360/97.01, 97.02, 137; 211/26, 41; 307/53; 369/77.2, 75.1, 77.1

(56) References Cited

U.S. PATENT DOCUMENTS

| 5,995,364 | A | * | 11/1999 | McAnally et al. | .......... 361/685 |
| 6,030,062 | A | * | 2/2000 | Chen et al. | ............... 312/223.2 |
| 6,386,656 | B1 | * | 5/2002 | Chen | ........................ 312/223.2 |
| 6,530,551 | B2 | * | 3/2003 | Gan | ............................ 248/694 |
| 6,538,879 | B2 | * | 3/2003 | Jiang | ........................... 361/683 |
| 6,711,011 | B2 | * | 3/2004 | Lee | ............................. 361/685 |
| 2003/0202322 | A1 | * | 10/2003 | Chen | ........................... 361/685 |

FOREIGN PATENT DOCUMENTS

TW     81205427     9/1996

* cited by examiner

*Primary Examiner*—Michael Datskovsky
(74) *Attorney, Agent, or Firm*—Wei Te Chung

(57) ABSTRACT

A drive bracket assembly includes a first drive bracket (20) attachable to a computer enclosure, a second drive bracket (30) attached to a base plate (24) of the first drive bracket, and a resilient fastener (40). Two generally arcuate sliding slots (244, 245) and three positioning portions (246) are formed at the base plate of the first drive bracket. A locking aperture (248) is defined in the base plate. Two posts (362) and three receiving portions (364) are formed at an upper plate (36) of the second drive bracket. A locking protrusion (442) is formed on the resilient fastener. In assembly, the posts are sliding received in the sliding slots, and slid therealong to inner ends thereof. The receiving portions respectively engage with the corresponding positioning portions. The locking protrusion snappingly engages in the aperture. Thus, the second drive bracket is readily mounted to the first drive bracket.

19 Claims, 6 Drawing Sheets

DRIVE BRACKET ASSEMBLY WITH FASTENER

BACKGROUND OF THE INVENTION

1. Field of the Invention

The present invention relates to drive brackets, and particularly to two drive brackets having fastening means for readily attaching them together.

2. Prior Art

When a typical personal computer is assembled, two drive brackets are often mounted into the enclosure. Then data storage devices such as a hard disk drive (HDD), a floppy disk drive (FDD) and a compact disk read only memory (CD-ROM) drive are attached to the drive brackets.

Users and manufacturers require the drive brackets to be installed in the computer enclosure quickly and easily. The first drive bracket is typically secured to the second drive bracket by riveting or by using a number of screws. However, such securing means are cumbersome and time-consuming. Taiwan Patent Application No. 81205427 discloses another conventional drive bracket for attachment to a computer enclosure. Referring to FIG. 6, a pair of L-shaped tabs 140' is formed from each of upper and lower portions of one side wall 120' of a first drive bracket 100' of a computer enclosure. A positioning aperture 160' is defined in the side wall 120' between the topmost pair of the tabs 140'. Two pairs of complementary L-shaped tabs 240' are formed at one side wall 220' of a second drive bracket 200', for engagement with the L-shaped tabs 140' of the first drive bracket 100'. A lip 260' is outwardly formed from the side wall 220' of the second drive bracket 200', for extension into the positioning aperture 160' of the first drive bracket 100'. Thus, the second drive bracket 200' is attached to the first drive bracket 100' of the computer enclosure. However, the inter-engagement of the L-shaped tabs 140', 240' allows vibration to occur in vertical directions. This can disrupt operation of the disk drives attached in the first and second drive brackets 100', 200', and can even lead to failure of the disk drives. Furthermore, when the second drive bracket 200' is attached to the first drive bracket 100', extra operating space within the computer enclosure itself is required. This is also the case when the second drive bracket 200' is detached from the first drive bracket 100'.

Thus, drive brackets having a fastening device which overcome the abovementioned problems are desired.

BRIEF SUMMARY OF THE INVENTION

Accordingly, an object of the present invention is to provide drive brackets having fastening means for readily and firmly securing one of the drive brackets to the other drive bracket.

Another object of the present invention is to provide drive brackets having fastening means for readily detaching one of the drive brackets from the other drive bracket.

To achieve the above-mentioned objects, a drive bracket assembly in accordance with the present invention comprises a first drive bracket attachable to a computer enclosure, a second drive bracket attached to a base plate of the first drive bracket, and a resilient fastener. Two generally arcuate sliding slots and three positioning portions are formed at the base plate of the first drive bracket. A locking aperture is defined in a rearward portion of the base plate. Two posts and three receiving portions are formed at an upper plate of the second drive bracket. A locking protrusion is formed on the resilient fastener. In assembly, the posts are slidingly received in the sliding slots, and slid therealong to inner ends thereof. The receiving portions respectively engage with the corresponding positioning portions. The locking protrusion snappingly engages in the aperture. Thus, the second drive bracket is readily mounted to the first drive bracket.

Other objects, advantages and novel features of the present invention will be drawn from the following detailed description of a preferred embodiment of the present invention with the attached drawings, in which:

DESCRIPTION OF THE PREFERRED EMBODIMENT

Figure 1:
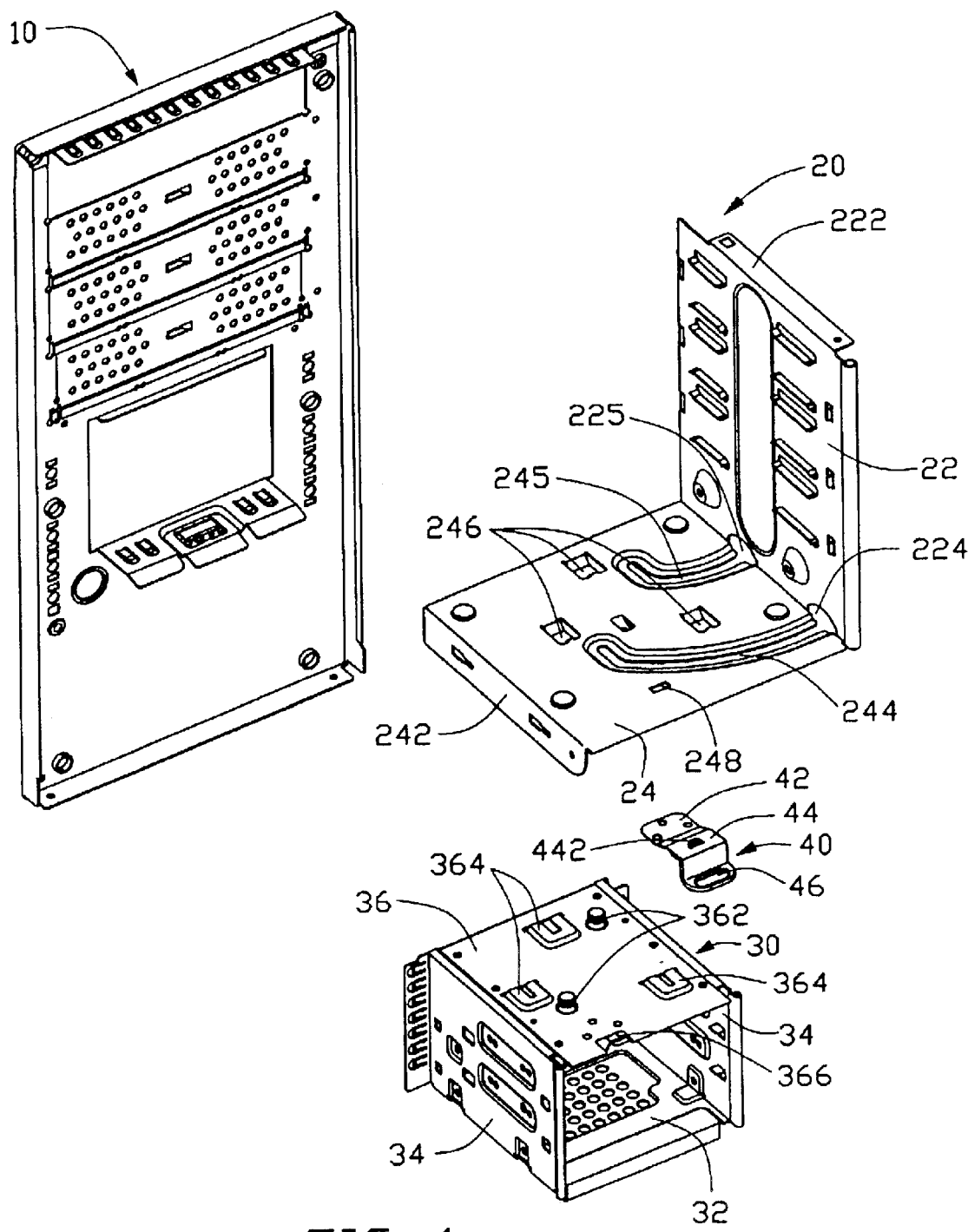
FIG. 1 is an exploded isometric view of a drive bracket assembly in accordance with the present invention, together with a front panel of a computer enclosure.

Referring to FIG. 1, a drive bracket assembly in accordance with the present invention comprises a first drive bracket 20, a second drive bracket 30 and a resilient fastener 40. The drive bracket assembly is attached to a front panel 10 of a computer enclosure (not shown).

Figure 2:
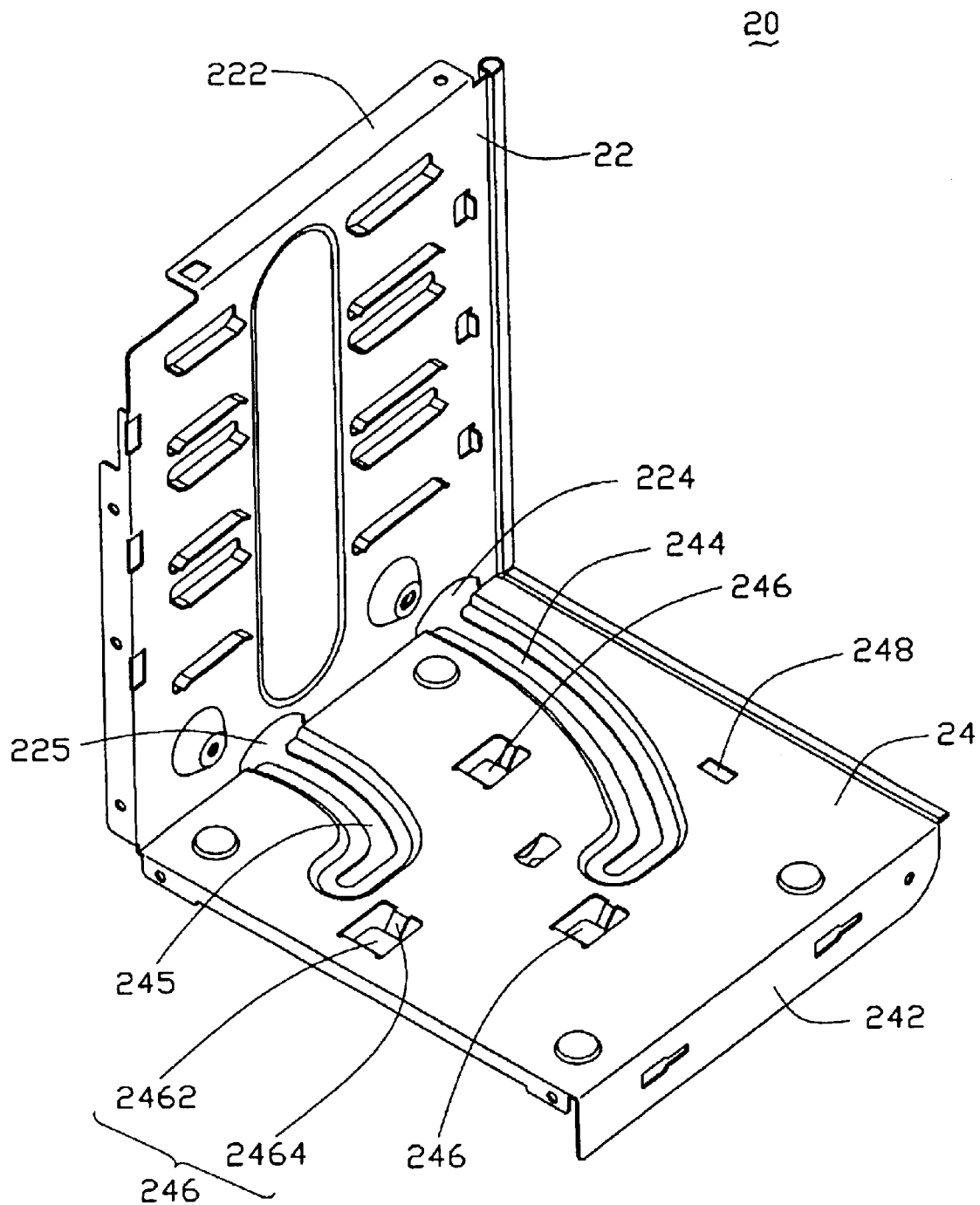
FIG. 2 is an isometric view of a first drive bracket of the drive bracket assembly of FIG. 1, viewed from another aspect.

Referring also to FIG. 2, the first drive bracket 20 is attachable to an upper portion of the front panel 10. The first drive bracket 20 is generally L-shaped, and comprises a base plate 24 and a side plate 22 extending perpendicularly upwardly from one side edge of the base plate 24. A first flange 242 depends from an opposite side edge of the base plate 24. A pair of spaced slots (not labeled) and a threaded hole (not labeled) are defined in the first flange 242. A second flange 222 extends horizontally outwardly from a top edge of the side plate 22. A locking hole (not labeled) and a threaded hole (not labeled) are defined in opposite ends of the second flange 222. The slots and the threaded hole of the first flange 242, and the locking hole and the threaded hole of the second flange 222 are used to secure the first drive bracket 20 to the computer enclosure.

The base plate 24 is stamped downwardly to form a pair of generally arcuate recessed portions (not labeled). Generally arcuate first and second sliding slots 244, 245 are respectively defined in the recessed portions. The slots 244, 245 are substantially parallel to each other, and extend from a junction of the base plate 24 and the side plate 22 to a middle portion of the base plate 24. Two guiding openings 224, 225 are defined in a bottom portion of the side plate 22, respectively in communication with the sliding slots 244, 245. A pair of positioning portions 246 is downwardly stamped from the base plate 24 in the vicinity of inner ends of the sliding slots 244, 245 respectively. Another positioning portion 246 is downwardly stamped from the base plate 24 between the first and second sliding slots 244, 245. Each positioning portion 246 comprises a horizontal bearing plate 2462 and a slanted strip 2464 connecting the bearing plate 2462 with the base plate 24. The slanted strip 2464 is narrower than the bearing plate 2462, and is located at a rearward side of the bearing plate 2462. A locking aperture 248 is defined in a rearward portion of the base plate 24, between the first sliding slot 244 and a rear edge of the base plate 24.

Figure 3:
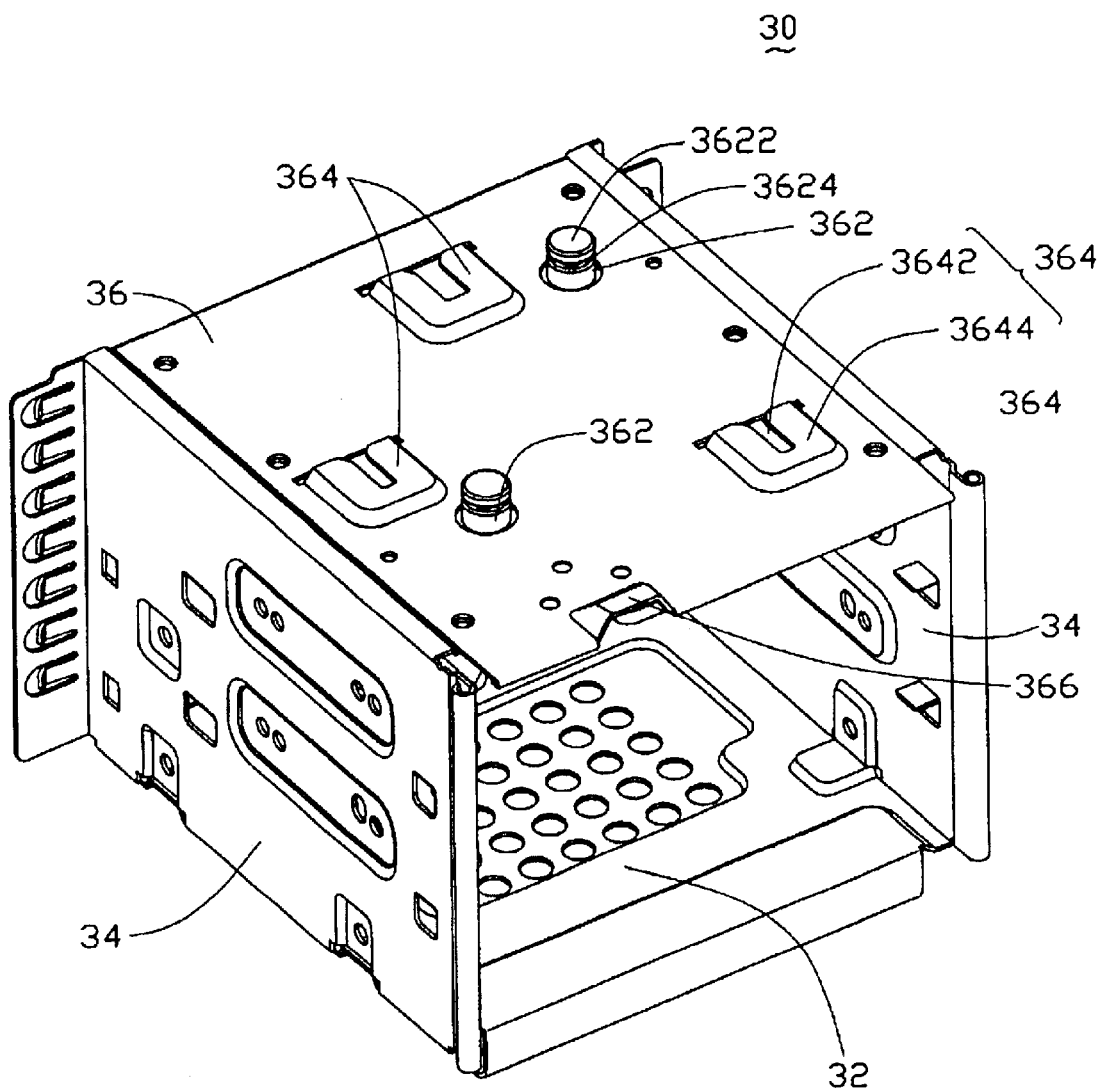
FIG. 3 is an enlarged isometric view of a second drive bracket of the drive bracket assembly of FIG. 1.

Referring also to FIG. 3, the second drive bracket 30 is attachable to the base plate 24 of the first drive bracket 20. The second drive bracket 30 is generally box-shaped. The second drive bracket 30 comprises a bottom wall 32, two side walls 34 extending upwardly from opposite sides of the bottom wall 32 respectively, and an upper wall 36 connecting top edges of the side walls 34, thereby defining a space (not labeled) therebetween for accommodating disk drives (not shown). Two posts 362 extend upwardly from substantially diagonally opposite portions of the upper wall 36, corresponding to the first and second slots 244, 245 of the first drive bracket 20. Each post 362 has a head 3622. An annular groove 3624 is defined in an outer face of each post 362 under the head 3622. Three receiving portions 364 are upwardly stamped from the upper wall 36 of the second drive bracket 30, corresponding to the positioning portions 246 of the first drive bracket 20. Each receiving portion 364 has a U-shaped engaging section 3644. An entrance (not labeled) is defined in the upper wall 36 at a front side of each receiving portion 364. A locking slot 3642 is defined in the engaging section 3644 in communication with the entrance. A supporting portion 366 is upwardly stamped from the upper wall 36 at a rear edge thereof. A plurality of threaded holes (not labeled) is defined in the upper wall 36 in the vicinity of the supporting portion 366.

The resilient fastener 40 is attachable to a top surface of the upper wall 36 of the second drive bracket 30. The resilient fastener 40 comprises a fixing section 42, a resilient section 44 extending outwardly and slightly upwardly and then horizontally from an end of the fixing section 42, and a operation section 46 depending from a distal end of the resilient section 44. A plurality of threaded holes (not labeled) is defined in the fixing section 42, corresponding to the threaded holes of the upper wall 36 of the second drive bracket 30. A locking protrusion 442 is upwardly stamped from the resilient section 44, corresponding to the locking aperture 248 of the base plate 24 of the first drive bracket 20.

Figure 4:
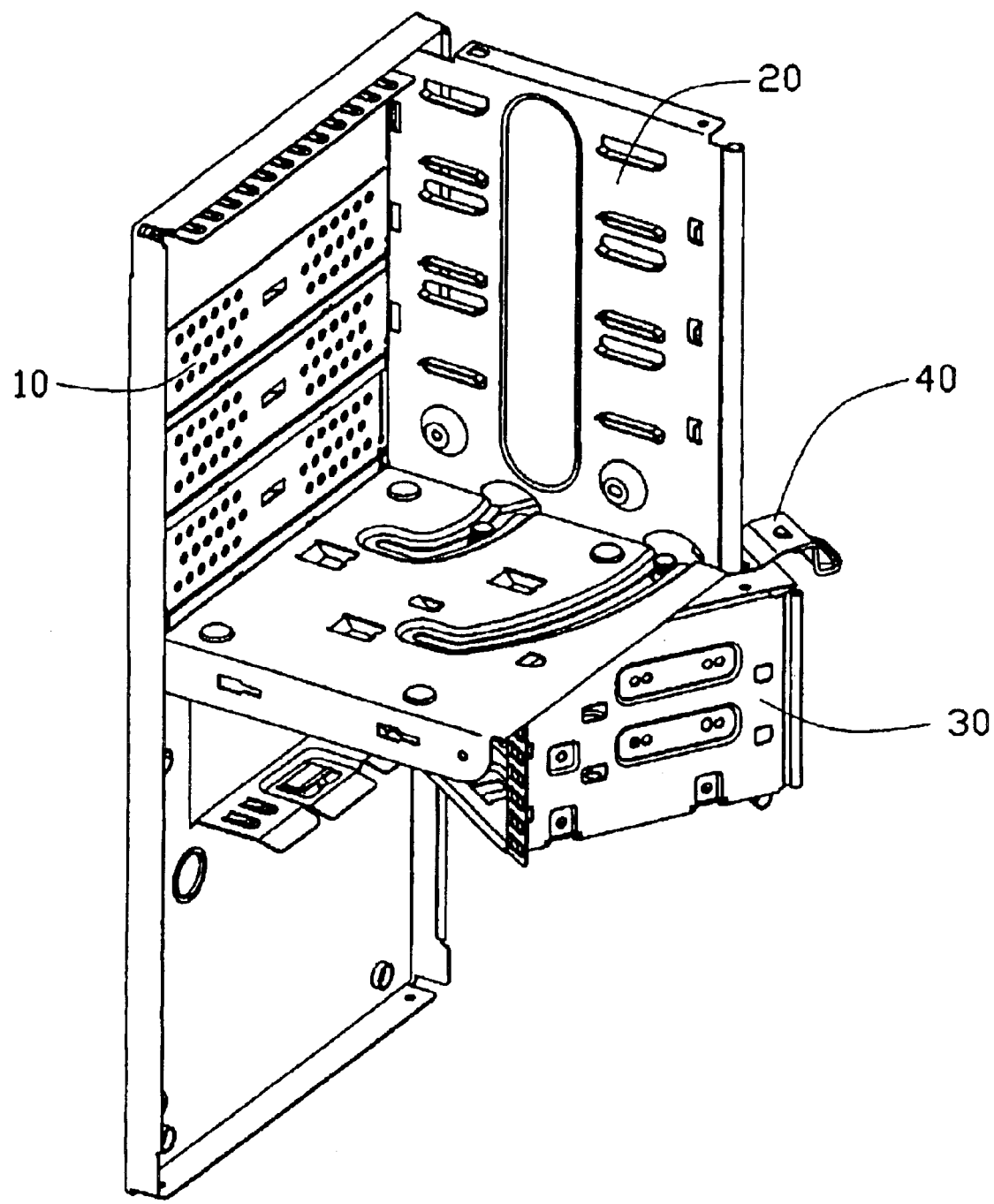
FIG. 4 is an assembled view of FIG. 1, showing the second drive bracket attached to the first drive bracket in an open position.
Figure 5:
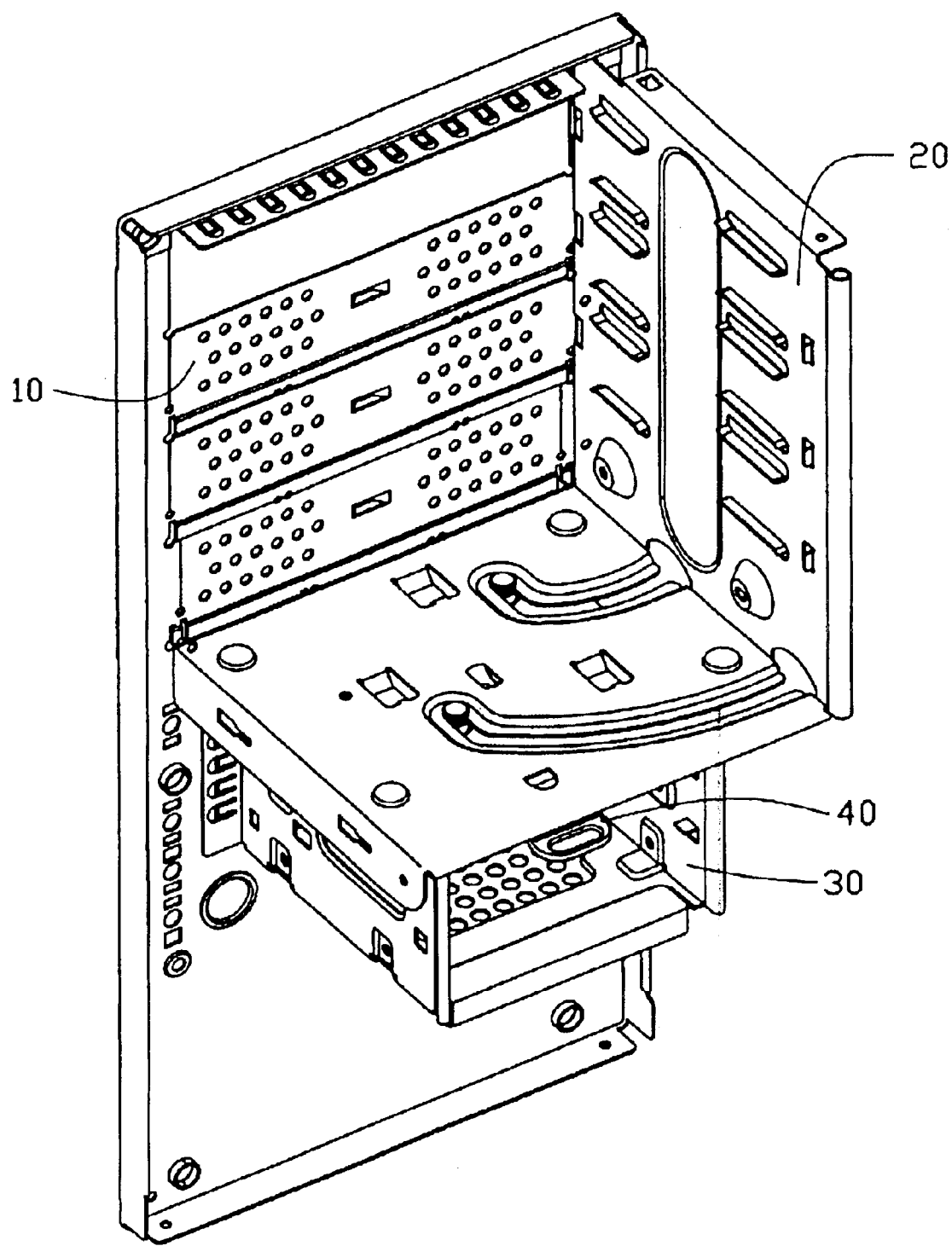
FIG. 5 is similar to FIG. 4, but showing the second drive bracket attached to the first drive bracket in a secured position.
Figure 6:
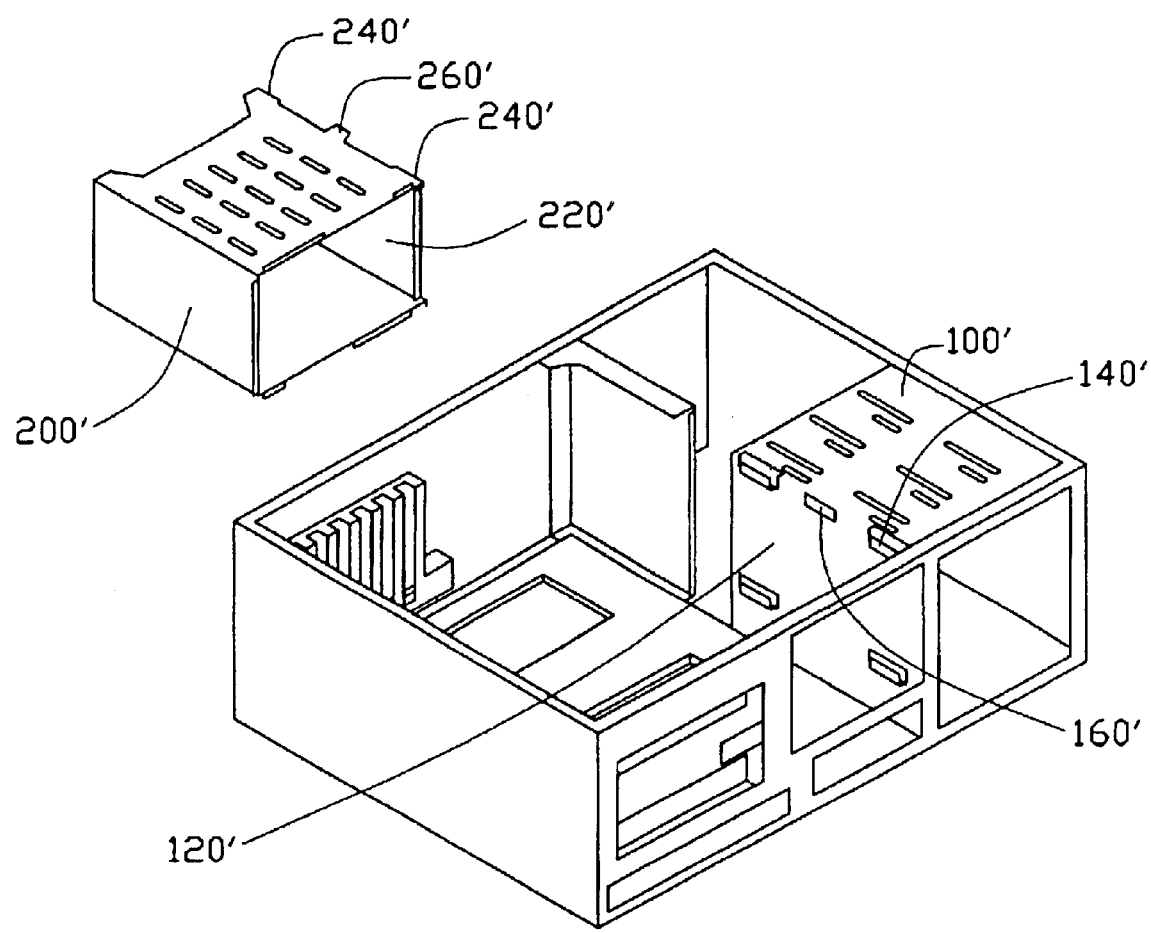
FIG. 6 is an exploded isometric view of a conventional computer enclosure having drive brackets.

Referring also to FIGS. 4 and 5, in assembly, the first drive bracket 20 is firstly secured to the front panel 10 by conventional means. Screws (not labeled) are extended through the threaded holes (not labeled) of the fixing section 42 and the threaded holes (not labeled) of the upper wall 36 to thereby attach the resilient fastener 40 to the second drive bracket 30. The posts 362 of the second drive bracket 30 are respectively slid into the first and second sliding slots 244, 245 of the base plate 24 of the first drive bracket 20 via the guiding openings 224, 225. The annular grooves 3624 of the posts 362 movably receive with the corresponding recessed portions of the base plate 24 at the sliding slots 244, 245. Finally, the posts 362 reach the inner ends of the first and second sliding slots 244, 245. The slanted strips 2464 of the positioning portions 246 of the base plate 24 are received in the locking slots 3642 of the receiving portions 364 of the second drive bracket 30. The engaging sections 3644 of the receiving portions 364 are supported by the bearing plates 2462 of the positioning portions 246. The locking protrusion 442 of the resilient fastener 40 is snappingly received in the locking aperture 248 of the base plate 24. Thus, the second drive bracket 30 is readily and securely attached to the first drive bracket 20. The resilient section 44 of the resilient fastener 40 resiliently abuts against the base plate 24, thereby dampening vibration as between the first and second drive brackets 20, 30.

In disassembly, the operation section 46 of the resilient fastener 40 is depressed to release the locking protrusion 442 of the resilient fastener 40 from the locking aperture 248 of the first drive bracket 20. Then the second drive bracket 30 is easily slid out from engagement with the first drive bracket 20 along the first and second sliding slots 244, 245 of the base plate 24 of the first drive bracket 20.

It is understood that the invention may be embodied in other forms without departing from the spirit thereof. Thus, the present example and embodiment are to be considered in all respects as illustrative and not restrictive, and the invention is not to be limited to the details given herein.

What is claimed is:

1. A drive bracket assembly for a computer enclosure, the drive bracket assembly comprising:
    a first drive bracket adapted to be fixedly attached to the enclosure, the first drive bracket having a base plate, at least one sliding slot being defined in the base plate;
    a second drive bracket movably attached to the base plate of the first drive bracket, the second drive bracket comprising at least one post being arranged on an upper plate thereof, an annular groove being defined in the at least one post slidably engaging with the base plate at the least one slot, wherein the at least one post is slidable along the at least one sliding slot from an open position to a secured position; and
    a resilient fastener attached to the upper plate of the second drive bracket, wherein in the secured position, the resilient fastener engages with the base plate of the first drive bracket; wherein
    at least one recessed portion is formed at the base plate of the first drive bracket, and the at least one sliding slot is defined in the at least one recessed portion.

2. The drive bracket assembly as described in claim 1, wherein the at least one post comprises a head, the annular groove is defined below the head, and the head is located in the at least one recessed portion.

3. The drive bracket assembly as described in claim 1, wherein at least one guiding opening is defined in the first drive bracket in communication with the at least one sliding slot, for facilitating engagement of the at least one post in the at least one sliding slot.

4. The drive bracket assembly as described in claim 1, wherein a positioning portion is arranged at the base plate of the first drive bracket, the positioning portion comprises a bearing section and a slanted section connecting the bearing section with the base plate, and the slanted section is narrower than the bearing section.

5. The drive bracket assembly as described in claim 4, wherein a receiving portion is arranged at the upper plate of the second drive bracket, corresponding to the positioning portion of the first drive bracket.

6. The drive bracket assembly as described in claim 5, wherein an entrance is defined in the upper plate at the receiving portion, and a locking slot is defined in the receiving portion in communication with the entrance, whereby the receiving portion can lockingly receive the slanted section of the positioning portion.

7. The drive bracket assembly as described in claim 1, wherein a locking aperture is defined in the base plate.

8. The drive bracket assembly as described in claim 7, wherein a locking member is arranged on the resilient fastener, for snappingly engaging with the locking aperture of the base plate.

9. The drive bracket assembly as described in claim 1, wherein the resilient fastener further comprises an operation section for facilitating operation thereof.

10. The drive bracket assembly as described in claim 1, wherein the at least one sliding slot is generally arcuate.

11. A drive bracket assembly for a computer enclosure, the drive bracket assembly comprising:

a first drive bracket adapted to be fixedly attached to the enclosure, the first drive bracket defining at least one sliding slot in a base plate thereof, the first drive bracket comprising at least one positioning portion and a locking means arranged at the base plate;

a second drive bracket movably attached under the first drive bracket, the second drive bracket comprising at least one sliding device arranged at an upper plate thereof and slidably engaged in the at least one sliding slot of the first drive bracket, and at least one receiving portion arranged at the upper plate for engagably receiving the at least one positioning portion of the first drive bracket; and a resilient fastener arranged on the second drive bracket, the resilient fastener comprising a resilient section for resiliently pressing the first drive bracket, and an operation section for facilitating operation of the resilient fastener, wherein a locking device is arranged at the resilient section for snappingly engaging with the locking means of the first drive bracket; wherein the at least one positioning portion comprises a bearing section and a slim section connecting the bearing section with the base plate, and the slim section is narrower than the bearing section.

12. The drive bracket assembly as described in claim 11, wherein at least one recessed portion is formed at the base plate of the first drive bracket, and the at least one sliding slot is defined in the at least one recessed portion.

13. The drive bracket assembly as described in claim 11, wherein the at least one sliding device of the second drive bracket comprises a post, the post comprises a head, and an annular groove is defined in the post under the head.

14. The drive bracket assembly as described in claim 11, wherein the slim section is slanted.

15. The drive bracket assembly as described in claim 14, wherein a receiving portion is arranged at the upper plate of the second drive bracket, corresponding to the positioning portion of the first drive bracket.

16. The drive bracket assembly as described in claim 15, wherein an entrance is defined in the upper plate at the receiving portion, and a locking slot is defined in the receiving portion in communication with the entrance, whereby the receiving portion can lockingly receive the slanted slim section of the positioning portion.

17. The drive bracket assembly as described in claim 11, wherein the locking means of the first drive bracket comprises a locking aperture, and the looking device of the resilient fastener comprises a locking protrusion.

18. The drive bracket assembly as described in claim 11, wherein the at least one sliding slot is generally arcuate.

19. A drive bracket assembly comprising:

a first drive bracket attached to an enclosure of a computer, said first drive bracket including a base plate with therein at least one curved sliding slot defining a curved insertion/withdrawal path thereof;

a second drive bracket moveably, along the curved path, attached to the base plate of the first drive bracket, said second drive bracket including at least one post with a large head thereof to be constantly hooked up in said sliding slot and moveable along said sliding slot;

plural interengaging means formed on said base plate and said second drive bracket which are not constantly engaged with each other but only when said second bracket is in a final assembled position with regard to the first drive bracket, said interengaging means reinforcing stability of assembling between said first drive bracket and said second drive bracket while not preventing withdrawal movement of said second drive bracket relative to the first drive along said curved path, wherein wherein there are two curved sliding slots cooperating with two heads to form two parallel curved paths, respectively.

* * * * *